(12) United States Patent
Takahashi et al.

(10) Patent No.: US 7,832,736 B2
(45) Date of Patent: Nov. 16, 2010

(54) GASKET

(75) Inventors: Kazuhiro Takahashi, Okayama (JP); Atsushi Sato, Okayama (JP)

(73) Assignee: Uchiyama Manufacturing Corp., Enami, Okayama-shi, Okayama (JP)

( * ) Notice: Subject to any disclaimer, the term of this patent is extended or adjusted under 35 U.S.C. 154(b) by 0 days.

(21) Appl. No.: 12/007,410

(22) Filed: Jan. 10, 2008

(65) Prior Publication Data

US 2008/0246232 A1   Oct. 9, 2008

(30) Foreign Application Priority Data

Jan. 16, 2007   (JP) .............................. 2007-007183

(51) Int. Cl.
*F16J 15/12* (2006.01)
*F02F 11/00* (2006.01)

(52) U.S. Cl. .................. 277/592; 277/594; 277/595; 277/654; 277/648; 277/652

(58) Field of Classification Search .................. 277/592, 277/593, 594, 595, 596, 652, 654, 648
See application file for complete search history.

(56) References Cited

U.S. PATENT DOCUMENTS

| | | | | |
|---|---|---|---|---|
| 4,140,323 A | * | 2/1979 | Jacobs ......................... | 277/594 |
| 4,743,421 A | * | 5/1988 | McDowell et al. .......... | 264/129 |
| 4,830,698 A | * | 5/1989 | DeCore et al. .............. | 156/219 |
| 5,582,415 A | * | 12/1996 | Yoshida et al. .............. | 277/592 |
| 6,145,847 A | * | 11/2000 | Maeda et al. ................ | 277/593 |
| 6,328,314 B1 | * | 12/2001 | Jinno et al. .................. | 277/593 |
| 6,343,795 B1 | * | 2/2002 | Zerfass et al. ............... | 277/593 |
| 6,517,085 B2 | * | 2/2003 | Udagawa et al. ............ | 277/592 |
| 6,783,132 B2 | * | 8/2004 | Nakamura ................... | 277/592 |
| 2002/0000696 A1 | * | 1/2002 | Okazaki et al. ............. | 277/592 |
| 2005/0057004 A1 | * | 3/2005 | Yamazaki et al. ........... | 277/592 |

FOREIGN PATENT DOCUMENTS

| | | |
|---|---|---|
| JP | B-84785 | 10/1994 |
| JP | 10-122369 | 5/1998 |
| JP | A 10 122370 | 5/1998 |

* cited by examiner

*Primary Examiner*—Alison K Pickard
(74) *Attorney, Agent, or Firm*—Bacon & Thomas, PLLC

(57) ABSTRACT

A gasket commonly used for a plural kinds of objective members to be sealed, the objective members having the same outer shapes and differently figured plural bores to be sealed. The gasket comprises a metal base plate, a compound layer made of a synthetic resin or of a rubber material mixed with a fiber material, the compound layer being integrally laminated on at least one surface of the metal base plate, a plurality of openings commonly used for the differently figured bores, a plurality of bead structures of a chevron-type full-bead commonly used for the differently figured bores, the plurality of bead structures being provided around each of the opening, and a recessed groove portion formed along and opposite side to the bead structure, the recessed groove portion being formed with an auxiliary sealing portion at a crossing part or at a matching part of the recessed groove portion, into which a sealing material made of a rubber material or of a synthetic resin is to be filled, for commonly use of the gasket.

8 Claims, 6 Drawing Sheets

GASKET

FIELD OF THE INVENTION

The present invention relates to a gasket capable of being commonly used for a plural kinds of objective members to be sealed, the objective members have the same outer shapes and differently figured plural bores to be sealed.

PRIOR ART

Several kinds of gaskets have been used for sealing a contacting surface and so on between a cylinder block and a cylinder head of an internal combustion engine. JP-B-6-84785 discloses a gasket material formed by coating a compound layer including a basic fiber and a rubber material on a metal plate. Further, JP-A-10-122369 and JP-A-10-122370 disclose a metal gasket in which a full-bead is formed around a combustion chamber hole and a stopper member made of an elastic rubber material is filled at a recessed surface side of the full-bead.

According to the gasket material disclosed by JP-B-6-84785, the compound layer has superior heat resistance than that made of only a rubber material, drift and peeling of the compound layer are hardly caused, the torque retention capacity is improved, and the facility of embossing process on a metal plate is also achieved. If such a material is used for the gasket having full-bead structure as shown in JP-A-10-122369 and JP-A-10-122370, it is served as a superior sealing gasket appropriate for sealing the above-mentioned contacting surface of the internal combustion chamber.

DISCLOSURE OF THE INVENTION

Problems to be Solved in the Invention

According to diversification of product such as upgrading, objective members to be sealed are recently used in many fields for integrally fastening via a gasket with a plural kinds of blocks and covers, which have the same outer shape and a plurality of bores to be sealed which are slightly different depending on the product specification. In case of assembling of such an objective members to be sealed, a plural kinds of gaskets with the same outer shape, having openings corresponding to the figuration of the bores to be sealed and having a full-bead therearound are prepared. Appropriate gasket is selected depending on each product specification and is interposed between the block and the cover to be fastened integrally in a fastening and assembly line of the members to be sealed.

In such a case, a plural kinds of gaskets have to be prepared depending on the product specification, thereby increasing the cost. Further, the shapes of such plural kinds of gaskets are similar (their outer shapes are the same), so that gaskets may be selected by mistake in case of assembly. Therefore, some identification means should be taken in order to clear the difference thereof in an assembly site. The above-mentioned prior arts do not intend to provide a gasket capable of being commonly used for a plural kinds of objective members to be sealed with different product specification, so that its drastic improvement has been highly desired.

The present invention is proposed in view of the above-mentioned problems. The object of the present invention is to provide a gasket capable of being commonly used for a plural kinds of objective members to be sealed having the same outer shapes and differently figured plural bores to be sealed.

Means to Solve the Problem

The gasket of the present invention is a gasket commonly used for a plural kinds of objective members to be sealed, the objective members having the same outer shapes and differently figured plural bores to be sealed. The gasket comprises a metal base plate, a compound layer made of a synthetic resin or of a rubber material mixed with a fiber material, the compound layer being integrally laminated on at least one surface of the metal base plate, a plurality of openings commonly used for the differently figured bores, a plurality of bead structures of a chevron-type full-bead commonly used for the differently figured bores, the plurality of bead structures being provided around each of the opening, and a recessed groove portion formed along and opposite side to the bead structure, the recessed groove portion being formed with an auxiliary sealing portion at a crossing part or at a matching part of the recessed groove portion, into which a sealing material made of a rubber material or of a synthetic resin is to be filled, for commonly use of the gasket.

According to the present invention, the auxiliary sealing portion of the recessed groove portion is preferably filled with the sealing material in a manner that the surface formed by filling the sealing material becomes same as the back surface of the gasket. Further, the sealing material is preferably a silicone rubber, but other rubber material or a synthetic resin may be used. Still further, the fiber material is preferable made of a compressible inorganic fiber except asbestos or a compressible organic fiber.

Effect of the Invention

The gasket of the present invention is composed of a metal base plate and a compound layer made of a synthetic resin or a rubber material mixed with a fiber material, the compound layer being integrally formed by laminating on at least one surface of the metal base. The compound layer has a superior heat resistance, and in addition the drift of the rubber material or the synthetic resin each constituting the compound layer or peeling thereof from the metal base plate are hardly caused when the gasket is interposed to be integrated between two objects to be sealed. Further, the gasket has an improved torque retention capacity and a superior right quality. In addition, emboss process facility is provided by the metal base plate and a bead structure integrally formed with the compound layer is easily achieved, thereby obtaining a superior shape retention capacity. Further provided are a plurality of openings and a plurality of bead structures with full-bead structure both of which can correspond to a plurality of bores to be sealed and can be commonly used for the different figuration of the bores to be sealed, so that one gasket can be used for a plural kinds of objective members to be sealed which have the same outer shape and have differently figured bores to be sealed. Therefore, it does not need to prepare a plural kinds of gaskets depending on the product specification in an integrally assembly procedure, thereby achieving low cost. In addition, the selection mistake is prevented during assembly so that special identification means is not required at the assembly site.

Further, an auxiliary sealing portion is provided by filling a sealing material made of a rubber material or a synthetic resin at a crossing part or a matching part formed accompanied with common use of a recessed groove formed along and opposite to the bead structure. Although a part of bead structure or recessed grove is designed to face the inside of the bore without being fastened and compressed under the condition that the gasket of the present invention is interposed to be fastened, the auxiliary seal part is provided at the crossing part or the matching part following the recessed groove, so that the flow of liquid passing through the bore along the recessed groove is blocked to prevent the liquid from leaking in and flowing out the other portions, thereby appropriately keeping the sealing ability of each bores to be sealed.

If the auxiliary seal portion formed by filling the sealing material is provided in such a manner that the surface becomes the same face with the surface opposite to the bead structure, the gap between the sealing surface and the objective member to be sealed is eliminated, so that the liquid along the recessed groove can be surely blocked. Further, if the sealing member is made of a silicone rubber, it is easily filled and has a superior adhesion ability to the objective member, thereby achieving accurate sealing of the filled portion. Still further, the silicone rubber is superior in the heat resistance and the chemical resistance, thereby being preferably used. If the fiber material is made of a compressible inorganic fiber other than asbestos or a compressible organic fiber, the characteristic of the compound layer is applied to obtain the sustention of sealing ability and the safeness of handling.

PREFERRED EMBODIMENTS TO EXECUTE THE INVENTION

Figure 1:
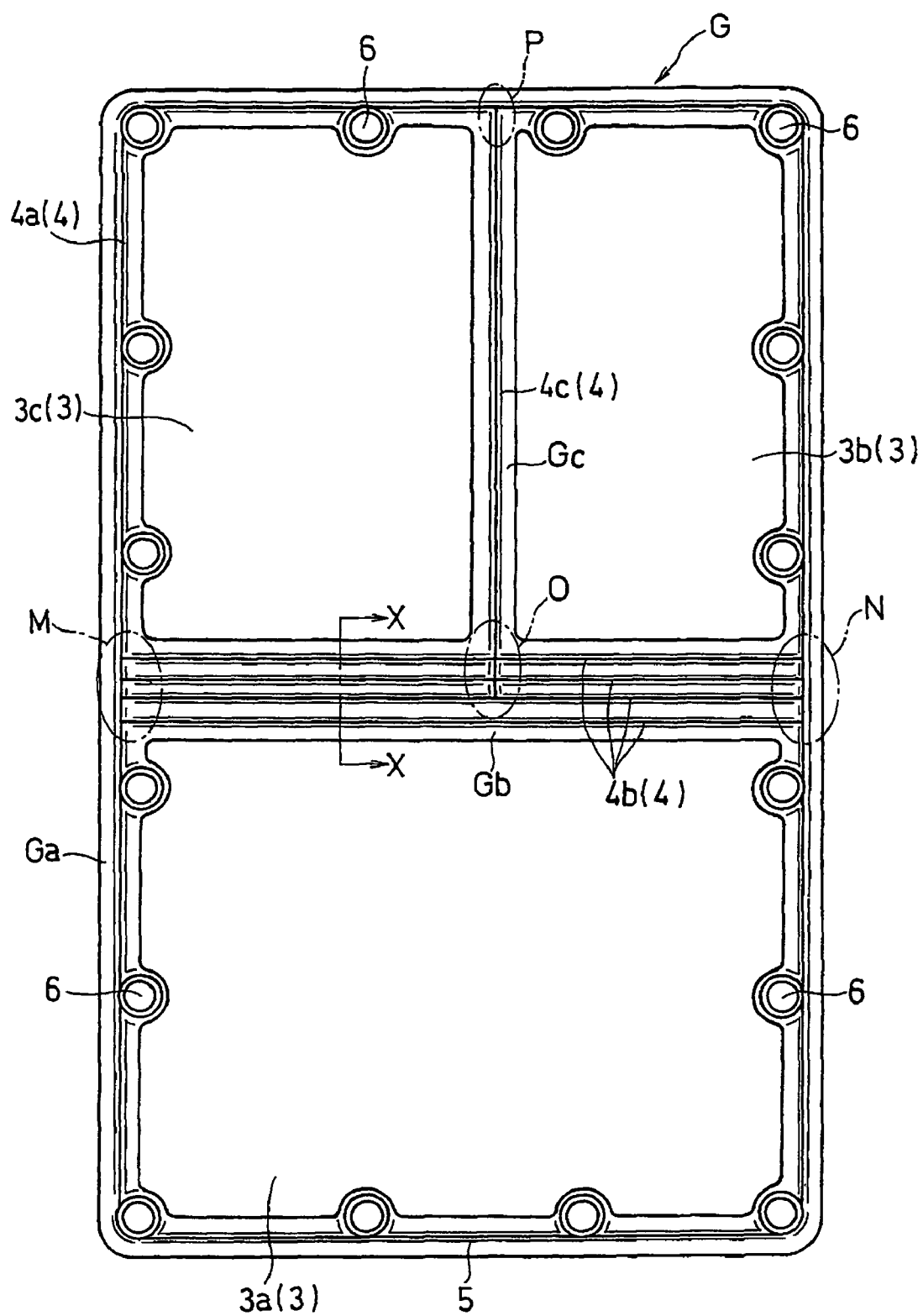
FIG. 1 is a diagrammatic plane view showing one embodiment of the gasket of the present invention.
Figure 2:
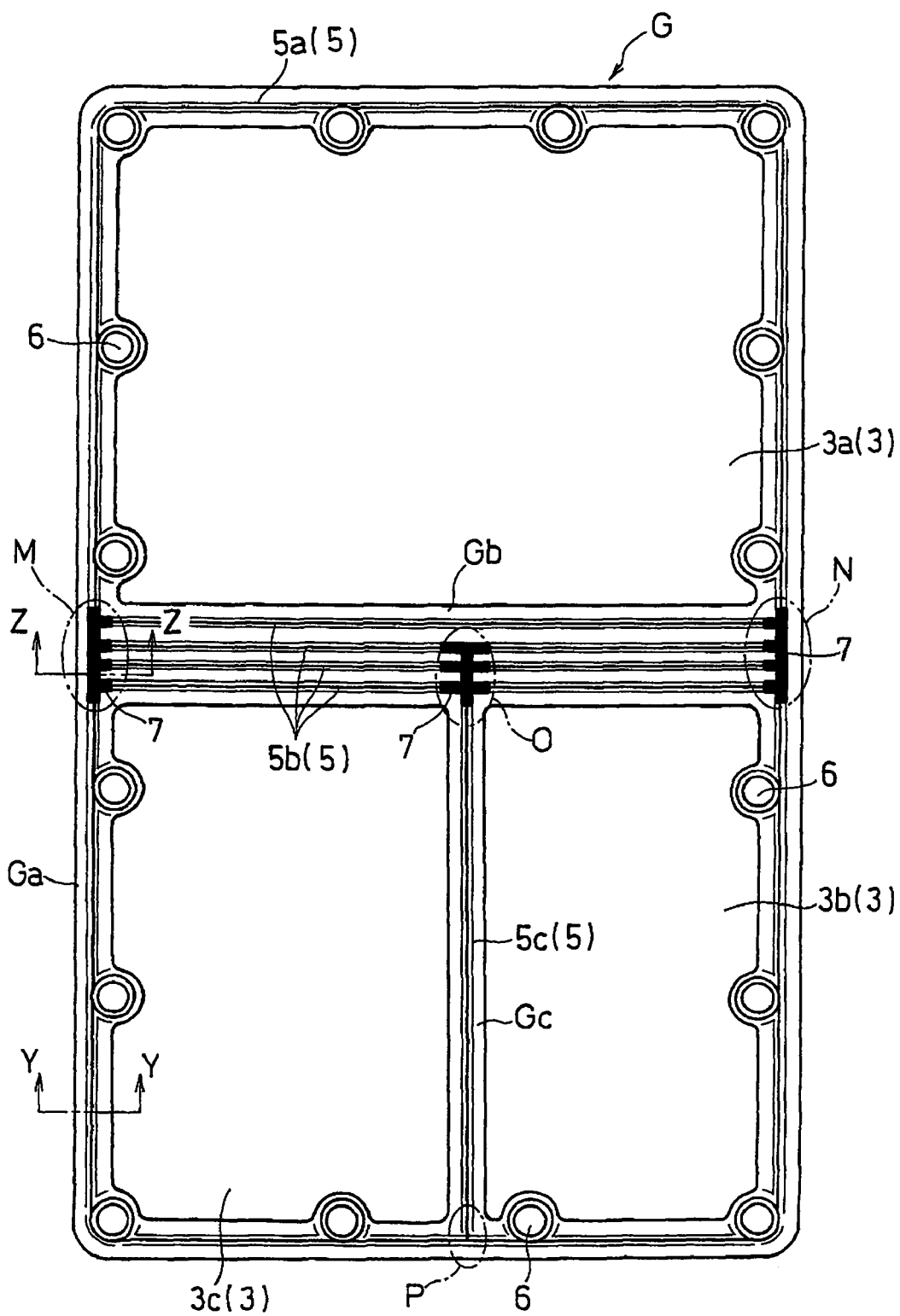
FIG. 2 is a back side view of the gasket.
Figure 3:
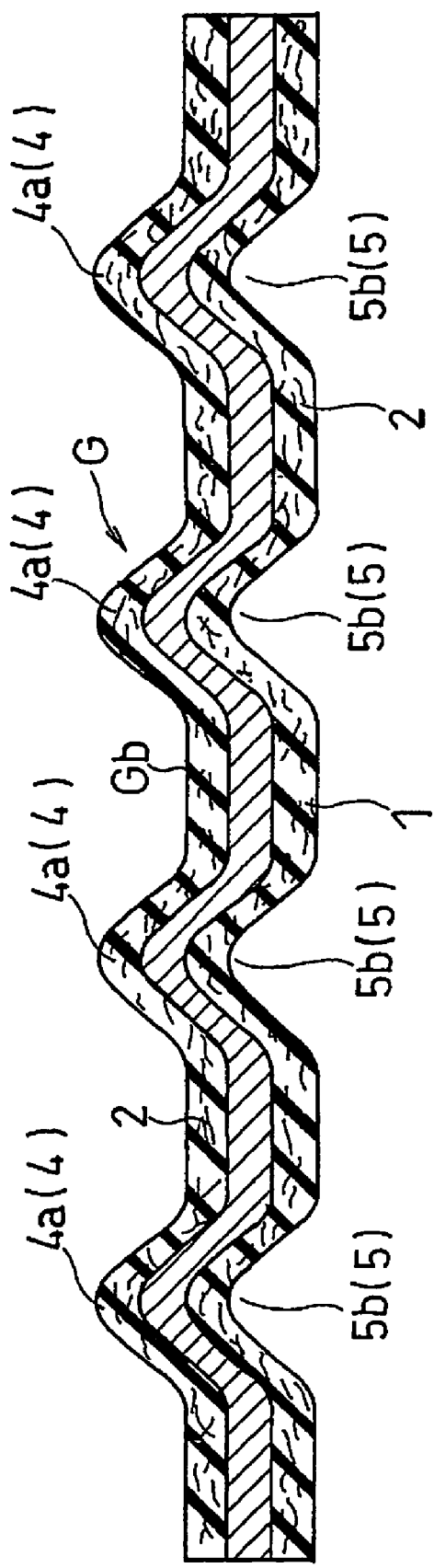
FIG. 3 is a fragmentary sectional view along the line X-X in FIG. 1.
Figure 4:
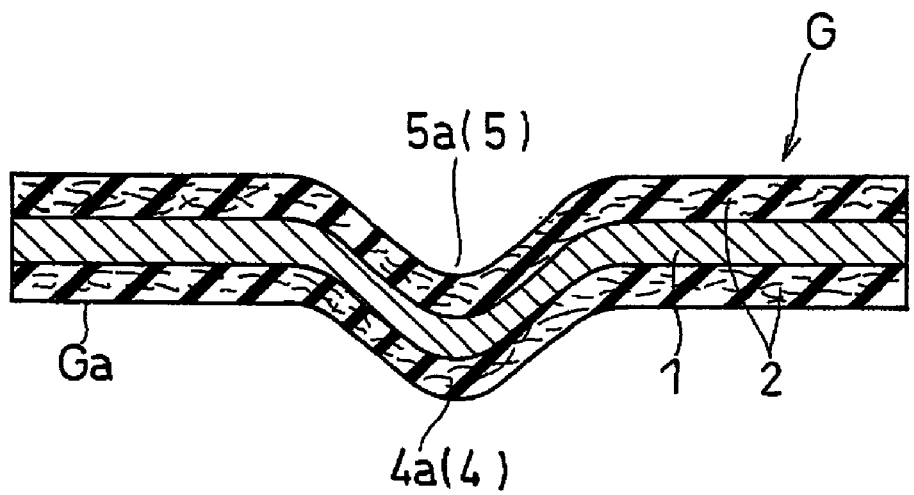
FIG. 4 is a fragmentary sectional view along the line Y-Y in FIG. 2.
Figure 5:
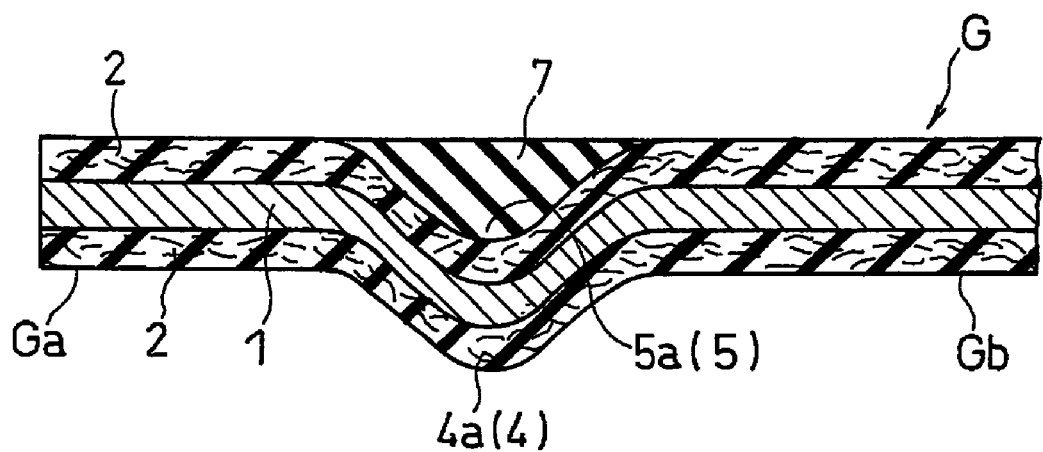
FIG. 5 is a fragmentary sectional view along the line Z-Z in FIG. 2.
Figure 6:
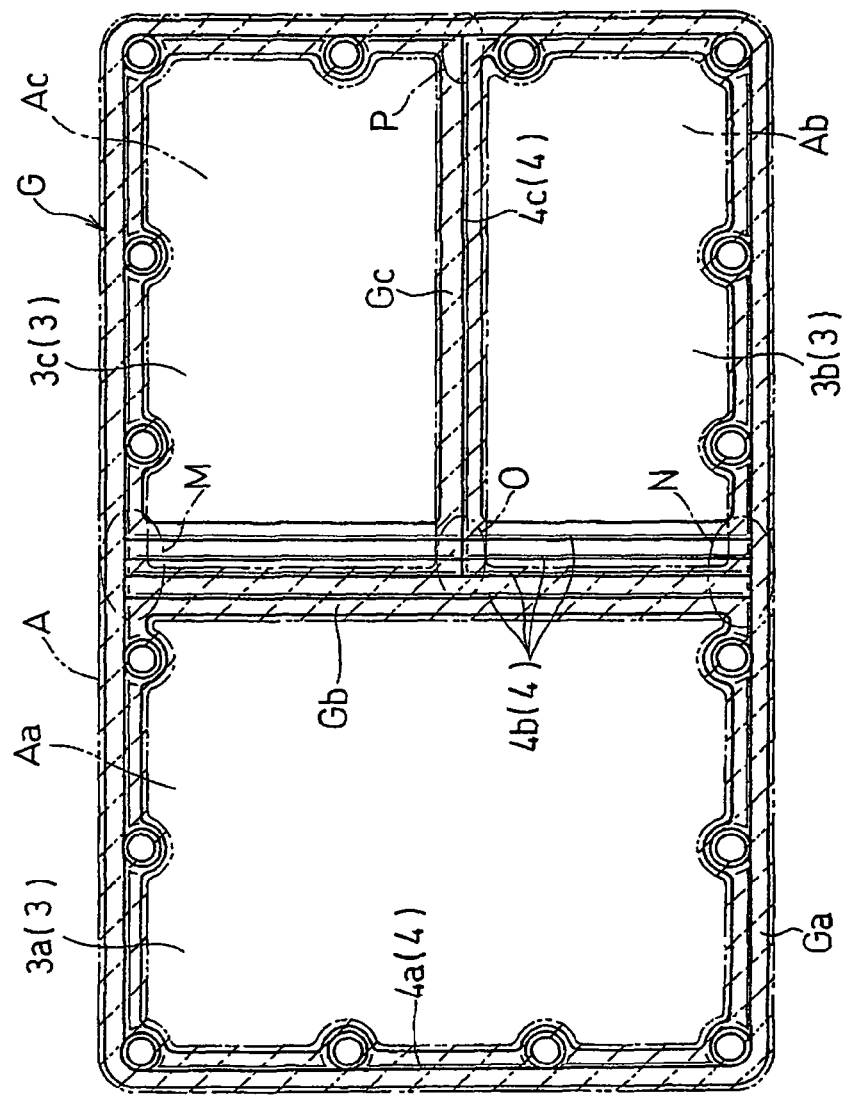
FIG. 6 shows a diagrammatic plane view showing how the gasket is used.
Figure 7:
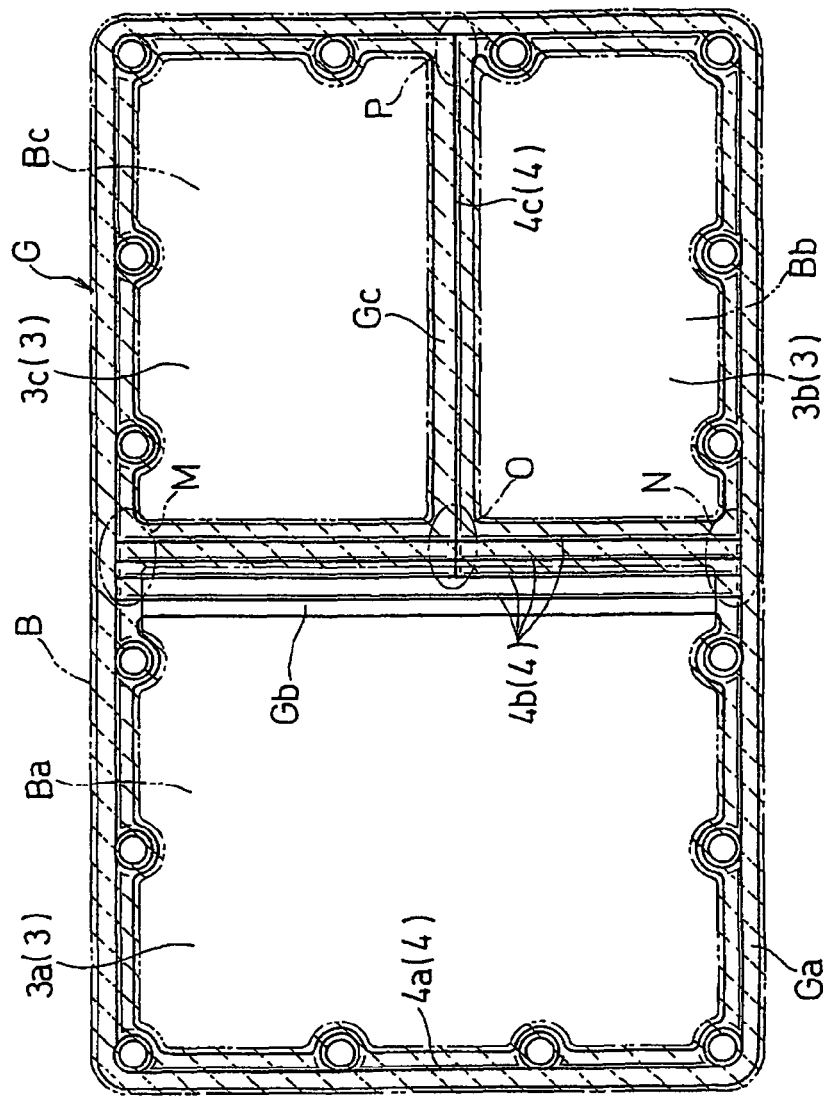
FIG. 7 shows another diagrammatic plane view showing how the gasket is used.

Now, the preferred embodiments of the present invention are explained referring to the drawings. FIG. 1 is a diagrammatic plane view showing one embodiment of the gasket of the present invention, FIG. 2 is its back side view, FIG. 3 is a fragmentary sectional view along the line X-X in FIG. 1, FIG. 4 is a fragmentary sectional view along the line Y-Y in FIG. 2, FIG. 5 is a fragmentary sectional view along the line Z-Z in FIG. 2, and FIG. 6 and FIG. 7 show diagrammatic plane views showing how the gasket is used.

The gasket G shown in the figure is formed in such a manner that a compound layer is applied to be integrally laminated on both sides of the metal base plate 1 such as an aluminum plate or a steel plate like a stainless steel plate, the compound layer being made of a synthetic resin or a rubber material mixed with a fiber material made of a compressible inorganic fiber other than asbestos or a compressible organic fiber and an additive agent (rubber chemicals, a filling agent or the like), thus compound layers 2, 2 are formed. The gasket has a plurality of openings 3 as mentioned later and a plurality of bead 4 of full-bead structure therearound. The compound material of the compound layer 2 in the figure is mixed with fiber, is imprinted and bonded with pressure by means of a roller using an adhesive agent on the metal plate, then is vulcanized to be bonded in an oven, thus obtaining a gasket sheet formed by integrally laminating the compound layer 2 on both sides of the metal plate 1. Otherwise, the compound material is formed like a sheet in advance, and is laminated on both sides of the metal base plate 1, thus obtaining a similar gasket sheet. The gasket sheet is punched out to form the above-mentioned plurality of openings 3 to have a desired shape. Before or at the same time of the punching out, a chevron-type bead 4 and a recessed groove 5 opposite thereof are formed. Further, a plurality of fastening bolt holes 6 are formed along the outer shape with appropriate spaces in case of punching out.

The fiber materials to be mixed with the compound material are a compressible inorganic fiber other than asbestos and a compressible organic fiber. For example, the compressible inorganic fiber other than asbestos may be rock wool; slag wool; glass fiber; ceramic fiber; mineral wool; fused quartz fiber; chemical processed high silica fiber; fused alumina silicate fiber; alumina continuous fiber; stabilized zirconia fiber; boron nitride fiber; alkali titanate fiber; whiskers; boron fiber; carbon fiber; metal fiber; or the like. The organic fiber may be aromatic polyamide fibers; other polyamide fibers; polyolefine fibers; polyester fibers; polyacrylonitrile fibers; polyvinyl alcohol fibers; polyvinylchloride fibers; polyurea fibers; polyurethane fibers; polyfluorocarbon fibers; phenol fibers; cellulosic fibers; or the like.

The rubber material comprising the compound material may be NBR; styrene-butadiene rubber (SBR); isoprene rubber (IR); chloroprene rubber (CR); butadiene rubber (BR); isobutylene-isoprene rubber (IIR); ethylene propylene rubber (EPM); fluoro rubber (FKM); silicone rubber (VMQ); chlorosulfonated polyethylene (CSM); ethylene-vinylacetate copolymer (EVA); chlorinated polyethylene (CPE); chloroisobutene-isoprene rubber (CIR); epichlorohydrin rubber (ECO); nitrile isoprene rubber (NIR); natural rubber (NR); or the like.

The synthetic resin comprising the compound layer may be phenolic resin, urea resin, melamine formaldehyde resin, epoxy resin, alkyd resin, unsaturated polyester resin, diallyl phthalate resin, silicon resin or the like. Further, a mixture of the above-mentioned rubber material and these resin materials may be used.

The gasket G in the figure has three openings 3 ($3a$, $3b$, $3c$) and is formed with a bead structure 4 around each opening 3 and a bolt hole 6 and with a recessed groove 5 opposite to the bead structure. The three openings $3a$, $3b$, $3c$ are formed so as to be capable of being commonly used for two kinds of objective members A, B to be sealed with differently figured three bores to be sealed as shown in FIG. 6 and FIG. 7. The objective members A, B to be sealed are manufactured in such a specification that they have the same rectangular outer shape, the bores Aa, Ab, Ac, of the objective member A to be sealed correspond to the bores Ba, Bb, Bc of the objective member B to be sealed respectively, the kinds of fluid passing each corresponding bores is the same, their shapes are similar, however their sizes are slightly different. The bore Aa of the objective member A to be sealed is a little smaller than the bore Ba of the objective member B to be sealed, the bore Ab is a little larger than the bore Bb, and the bore Ac is a little larger than the bore Bc.

The gasket G is formed so as to be commonly used for two kinds of objective members A, B to be sealed as mentioned above. Specifically, the opening $3a$ approximately corresponds to the size of the bore Aa of the objective member A to be sealed, the opening $3b$ approximately corresponds to the size of the bore Bb of the objective member B to be sealed, and the opening $3c$ approximately corresponds to the size of the bore Bc of the objective member B to be sealed. As the result, the opening $3a$ becomes smaller than the bore Ba of the objective member A to be sealed and the openings $3b$, $3c$ become smaller than the bores Ab, Ac of the objective member A to be sealed respectively. The gasket G comprises a rectangular outer frame Ga and a partition frames Gb, Gc forming like a letter "T" for dividing the inside of the outer frame Ga into three openings 3a, 3b, 3c. The partition frame Gb constitutes a border between the openings 3a and 3b and the openings 3b and 3c, and the partition frame Gc forms a border between the openings 3b and 3c.

A bead 4 (4a, 4b, 4c) with full-bead structure is provided for the outer frame Ga and the partition frames Gb, Gc along the circumference of the openings 3a, 3b, 3c respectively in order to make sure the sealing of the bores Aa, Ab, Ac, Ba, Bb, Bc. A recessed groove 5 (5a, 5b, 5c) is formed at the opposite surface (back side) accompanied with the configuration of the bead 4. Namely, the bead 4a and the recessed groove 5a are annular shaped in a line along the outer frame Ga, and the bead 4b and the recessed groove 5b are formed in four-line along the partition frame Gb, and the bead 4c and the recessed groove 5c are formed in a line along the partition frame Gc. The both ends of four lines of bead 4b and the recessed groove 5b cross or join the bead 4a and the recessed groove 5a respectively (it is referred as the crossing part M, N hereinafter), one end of the bead 4c and the recessed groove 5c crosses or joins three lines of the bead 4b and the recessed groove 5b respectively (it is referred as the crossing part O), and the other end of the bead 4c and the recessed groove 5c crosses or joins the bead 4a and the recessed groove 5a respectively (it is referred as the crossing P), thus keeping the continuity of the bead 4 and the recessed groove 5.

Now explained is how the two kinds of objective members A, B are sealed with the gasket G having the bead 4 and the groove 5 as mentioned above. FIG. 6 and FIG. 7 diagrammatically show the gasket G is interposed between the objective surfaces of the members A, B to be sealed so as to be integrally fastened.

When the gasket G is used for sealing the member A, the bead 4a and the two lines of bead 4b at the opening 3a side relate to the sealing of the bore Aa, and the bead 4a, the two lines of bead 4b at the opening 3a side and the bead 4c relate to the sealing of the bores Ab, Ac. Therefore, a part of the partition frame Gb faces the inside of the bores Ab, Ac, and the two beads 4b and the recessed groove 5b of the partition frame Gb formed opposite to the opening 3a are exposed to the fluid passing through the bores Ab, Ac. Accordingly, each fluid may flow into the neighboring bores Ab, Ac through the recessed grooves 5a or 5c from the recessed groove 5b which is exposed to the fluid, however, an auxiliary sealing portion 7 is provided at the recessed groove 5 of the crossing parts M, N, O as shown in FIG. 2 and FIG. 5, so that the fluid flow is prevented and there causes no fear that the fluid may flow into the neighboring bores Ab, Ac through the recessed groove 5.

When the gasket G is used for sealing the member B as shown in FIG. 7, the bead 4a and the two lines of bead 4b opposite to the opening 3a relate to the sealing of the bore Ba, and the bead 4a, the two lines of bead 4b opposite to the opening 3a and the bead 4c relate to the sealing of the bores Bb, Bc. Therefore, a part of the partition frame Gb faces the inside of the bore Ba, and the two beads 4b at the opening 3a side and the recessed groove 5b of the partition frame Gb are exposed to the fluid passing through the bore Ba. Accordingly, each fluid may flow into the recessed grooves 5a or 5c from the recessed groove 5b which is exposed to the fluid, however, an auxiliary sealing portion 7 is provided at the recessed groove 5 of the crossing parts M, N, O as shown in FIG. 2 and FIG. 5, so that the fluid flow is prevented and there causes no fear that the fluid in the bore Ba may flow into the part which is not related to its sealing.

In this embodiment, in either case of the objective members A, B to be sealed, the bead 4 and the recessed groove 5 are fastened and compressed and are not exposed to the fluid in each bore at the crossing part P, so that an auxiliary sealing portion is not required.

Accordingly, the gasket G in the figures can be commonly used for the two kinds of objective members A, B to be sealed having the same outer shape and bores to be sealed Aa, Ab, Ac, Ba, Bb, Bc with different figuration. If the objective members to be sealed A, B are randomly placed on an assembly line depending on the production plan, there is no fear of attachment of wrong gasket G and no identification means is required and there is no need of identification means. The auxiliary sealing portion 7 is provided by filling a sealing material at the crossing part or the matching part of the recessed groove 5 accompanied with the formation of the bead 4, so that the fluid is prevented from entering to a part where liquid is not necessary through the recessed groove 5. Therefore, the gasket G can be preferably and commonly used for the two kinds of objective members A, B to be sealed, thereby attributing the reduction of the production cost of the members A, B.

The outer shape of the gasket G and the shape, number and figuration of the opening 3 are not limited to those shown in the figures. They may be modified according to the shape of the objective member to be sealed and the figuration of the objective bore to be sealed, and accordingly the figuration of the bead 4 and the recessed groove 5 may be also determined accordingly. Further, the crossing part or the matching part may be varied. The crossing part or the matching part to be provided with the auxiliary sealing part is reasonably provided considering an expected flow pass. In this specification, the compound layer 2 is integrally laminated on both sides of the metal base plate 1, however, it may be integrally laminated only on a surface where the bead 4 is formed. Further, the metal base plate 1 is exposed at the outer circumference and the inner circumference of the gasket G by punching out, however, such a part may be covered with the compound layer 2. In addition, a graphite coating layer may be provided on the surface of the compound layer 2 or a silicone resin coating layer may be provided as an adhesion preventing membrane.

The invention claimed is:

1. A gasket used for various kinds of objective members to be sealed, said objective remembers having the same outer shape and a plurality of differently figured bores,
    said gasket comprising:
    a metal base plate;
    a compound layer made of a synthetic resin or of a rubber material mixed with a fiber material, said compound layer being integrally laminated on at least one surface of said metal base plate;
    an outer frame and a partition frame formed inside of said outer frame for defining openings formed corresponding to said plurality of bores;
    a common bead structure for sealing, constituted by chevron-type full-beads, on whose opposite sides recess grooves are formed provided on said outer frame and at common portions of said partition frame, said chevron-type full beads of said common portion sealing such openings for bores that are not associated with the difference of shape of the bore due to the kinds of objective members; and
    a selective bead structure for sealing, constitute by a plurality of chevron-type full beads on whose opposite sides recess grooves are formed, provided at the other portions of said partition frames except said common portions thereof, at least one of said chevron-type full beads of said selective bead structure sealing such bores that are not sealed with said chevron-type full beads of said common bead structure, wherein:

a sealing material made of a rubber material or of a synthetic resin is filled only into the grooves of said chevron-type full beads where said chevron-type full beads of said common bead structure and those of said selective bead structure are crossed or matched, thereby constituting an auxiliary sealing portion.

2. The gasket as set forth in claim 1, wherein said auxiliary sealing portion of said recessed groove portion is filled with said sealing material in a manner that the surface formed by filling said sealing material becomes same as the back surface of said gasket.

3. The gasket as set forth in claim 2, wherein said sealing material is a silicone rubber.

4. The gasket as set forth in claim 2, wherein said fiber material is made of a compressible inorganic fiber except asbestos or a compressible organic fiber.

5. The gasket as set forth in claim 1, wherein said sealing material is a silicone rubber.

6. The gasket as set forth in claim 5, wherein said fiber material is made of a compressible inorganic fiber except asbestos or a compressible organic fiber.

7. The gasket as set forth in claim 1, wherein said fiber material is made of a compressible inorganic fiber except asbestos or a compressible organic fiber.

8. The gasket as set forth in claim 7, wherein said fiber material is made of a compressible inorganic fiber except asbestos or a compressible organic fiber.

* * * * *